TRANSISTOR STRUCTURE AND METHOD OF MAKING THE SAME

Filed March 20, 1957

INVENTOR.
Robert N. Noyce
BY [signature]
ATTORNEYS

United States Patent Office 2,968,750

Patented Jan. 17, 1961

2,968,750

TRANSISTOR STRUCTURE AND METHOD OF MAKING THE SAME

Robert N. Noyce, Los Altos, Calif., assignor, by mesne assignments, to Clevite Corporation, Cleveland, Ohio, a corporation of Ohio Filed Mar. 20, 1957, Ser. No. 647,236

2 Claims. (Cl. 317—235)

This invention relates generally to a transistor structure and method of making the same, and more particularly to a transistor structure suitable for high frequency operation.

As transistor structures are designed for higher and higher frequency operation, it is found that the structure must be small in more than one dimension. For example, the base region must be made relatively thin and narrow to reduce the base resistance.

An object of the present invention is to provide an improved transistor structure and method of making the same.

It is another object of the present invention to provide a transistor structure which has a region which is relatively small in more than one direction and a method of making the same.

It is another object of the present invention to provide a transistor structure which includes a central region having a high conductivity grid-like structure.

These and other objects of the invention will become more clearly apparent from the following description when read in conjunction with the accompanying drawings.

Referring to the drawings:

Figure 1A–B is a sectional view showing two steps in the forming of the improved structure of the invention;

Figure 4:
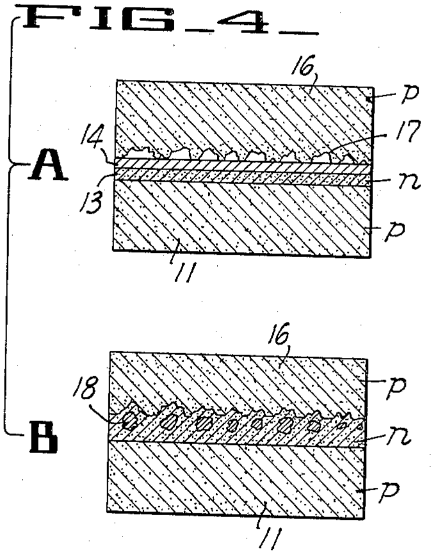
Figure 5:
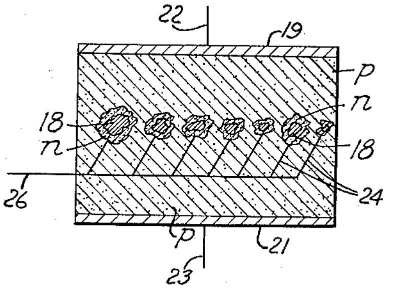

Figure 4A—B shows the final step in the forming of the transistor structure of the invention; and Figure 5 shows an enlarged view of a portion of another transistor structure formed in accordance with the invention.

Figure 1:
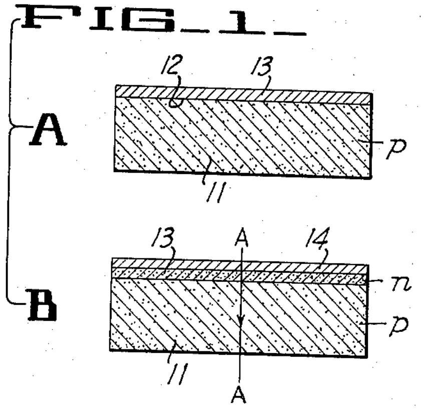
Figure 2:
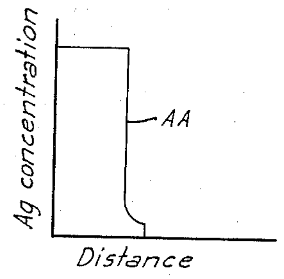
Figure 2 shows a graph of concentration of silver as a function of distance along the line A—A of Figure 1B.
Figure 3:
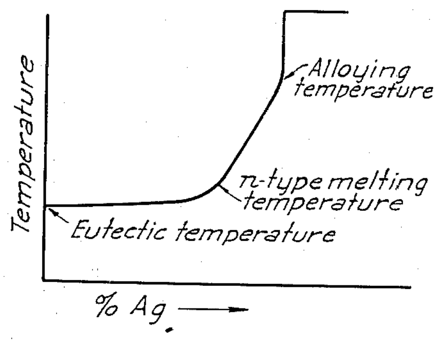
Figure 3 is a curve of the distribution of melting points of the n-type layer of Figure 1.

Referring to Figure 1A, a block of semiconductive material 11, for example p-type, has a highly polished optically flat surface 12 formed thereon. A metal 13 such as silver containing some arsenic is placed on the surface 12, as for example, by evaporation, to a thickness of 2–10 microns. The metal is then alloyed into the polished block of material. The alloying consists of heating the p-type block with the metal surface in an oven to a temperature which is above the melting point of the silver-arsenic combination but below the melting point of the underlying p-type block. The block may, for example, be p-type silicon, 1–5 ohm centimeters ($3\times10^{15}$–$1.6\times10^{16}$ donors/cc.). The result is that the silver and arsenic combination dissolves the silicon and recrystallizes to give a structure of the type shown in Figure 1B. Some arsenic remains in the recrystallized material to form an n-type layer 13. A layer of silver-silicon eutectic 14 is formed overlying the n-type layer. The upper surface of the block of Figure 1 remains flat. The silver concentration as a function of distance along the line A—A is schematically shown in Figure 2. The recrystallized n-type layer has a distribution of melting points as shown in Figure 3 which lie between the silver-silicon eutectic temperature and the alloying temperature.

After a block of the type shown in Figure 1B is formed, a block 16 (Figure 4A) which has a plurality of generally parallel grooves 17 on one surface which is optically flat is brought into contact with the upper surface of the block of Figure 1B with the crystal orientation of the two blocks the same. Thus, the two blocks are in contact along the ridges of the grooved block. The grooves may, for example, be formed by grinding the surface. A 240–600 mesh silicon carbide grinding compound is suitable for this purpose. The block 16 may, for example, be p-type silicon having $10^{18}$ to $10^{19}$ donors/cc., which in the final device forms a source or emitter.

The two pieces are placed in an oven, preferably vacuum, and pressure is applied between contacting surfaces. The combination is raised above the silver-silicon eutectic temperature. A small amount of the ground piece of silicon is dissolved in the silver-silicon mixture. If the temperature is held below the first alloying temperature, not all of the recrystallized n-type layer will liquify. On cooling, a continuous n-type layer will remain between the two p-type pieces of semi-conductive material. The n-type layer and the p-type block stick together to form a single block. Furthermore, recrystallization will occur on the silicon surface so that the remaining silver-silicon eutectic separates from the recrystallized regions as shown in Figure 4B. The silver-silicon eutectic forms higher conductivity paths or grids 18 along the grooves through the n-type region. These grids serve to reduce the base resistance of the junction transistor. Contacts are then made to the p-type regions and to the ends of the grids.

It is, of course, apparent that an n-p-n type transistor may be formed by employing a silicon semiconductive material and alloying a silver combination to form a p-type layer and a silver-silicon eutectic. Subsequently, the pieces are brought together and the temperature elevated, as previously described.

A field effect, a zero base width junction transistor, or a zero channel length field effect transistor may be constructed by employing the techniques described. However, if in the final alloying operation, where the two blocks are brought together under pressure in an oven, the temperature is raised above the temperature used for the first alloying, the original p-type crystals come into contact resulting in the structure of Figure 5. The structure has p-type material which is continuous all the way through with high conductivity grids 18 surrounded by n-type layers. The n-type layers act as the control gates for a field effect transistor or as the grids of the anti-field effect transistor. It is, of course, apparent that the drawings are for purposes of illustration only with dimensions exaggerated to more clearly bring out the invention.

Conductive material may be applied on opposite edges of the structure as at 19 and 21 in any known manner to provide ohmic contact with the p-type material. Leads 22 and 23 may then be connected. Likewise leads 24 may be applied to the n-type regions and connected to a common lead 26. Thus, a complete field effect transistor is formed having the current carrying leads 22 and 23 and the control lead 26.

The transistor structures of the invention have regions of opposite conductivity type formed in a crystal which are small in two directions thereby permitting high frequency operation. The resistance of the region is considerably lowered by the incorporation of the grid-like structure having a relatively high conductivity.

I claim:

1. A transistor structure including first regions of one conductivity type, grid-like elements disposed in said regions, said grid-like elements entirely comprising a eutectic mixture of a semiconductive material and a metal, and seimconductive material of opposite conductivity type completely encircling said first regions and said grid-like elements and forming junctions with said first regions, current carrying leads connected to opposite sides of said material of opposite conductivity type and additional leads connected to said first regions.

2. The transistor structure including a region of semiconductive material of one conductivity type forming a body of semiconductive material, grid-like elements disposed in said body, said grid-like elements comprising entirely a eutectic mixture of semiconductive material and a metal, and semiconductive material of opposite conductivity type within said region completely encircling said elements and forming a junction with the surrounding semiconductive material of said body, said material of opposite conductivity type forming a non-continuous layer in the body of the device, leads connected to opposite sides of said structure, and additional leads connected to said semiconductive material of opposite conductivity type, whereby said first mentioned leads form current carrying connections and said second mentioned leads form control electrodes.

References Cited in the file of this patent

UNITED STATES PATENTS

| | | |
|---|---|---|
| 2,569,347 | Shockley | Sept. 25, 1951 |
| 2,701,326 | Pfann et al. | Feb. 1, 1955 |
| 2,714,183 | Hall et al. | July 26, 1955 |
| 2,721,965 | Hall | Oct. 25, 1955 |
| 2,728,034 | Kurshan | Dec. 20, 1955 |
| 2,743,201 | Johnson et al. | Apr. 24, 1956 |
| 2,780,569 | Hewlett | Feb. 5, 1957 |
| 2,792,538 | Pfann | May 14, 1957 |